Sept. 19, 1972 R. L. DEARTH ET AL 3,692,539
MANUFACTURE OF SAUSAGE PRODUCTS
Filed Jan. 19, 1971 4 Sheets-Sheet 3

INVENTORS
Robert L. Dearth and
BY Rodger M. Lindle

Frease & Bishop
ATTORNEYS

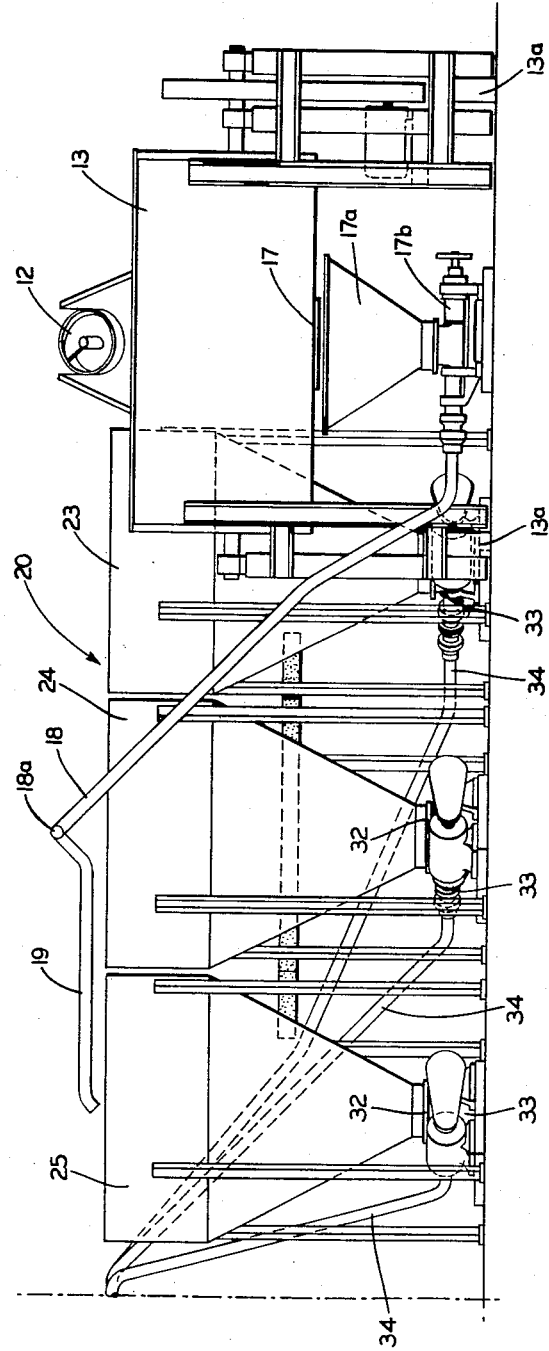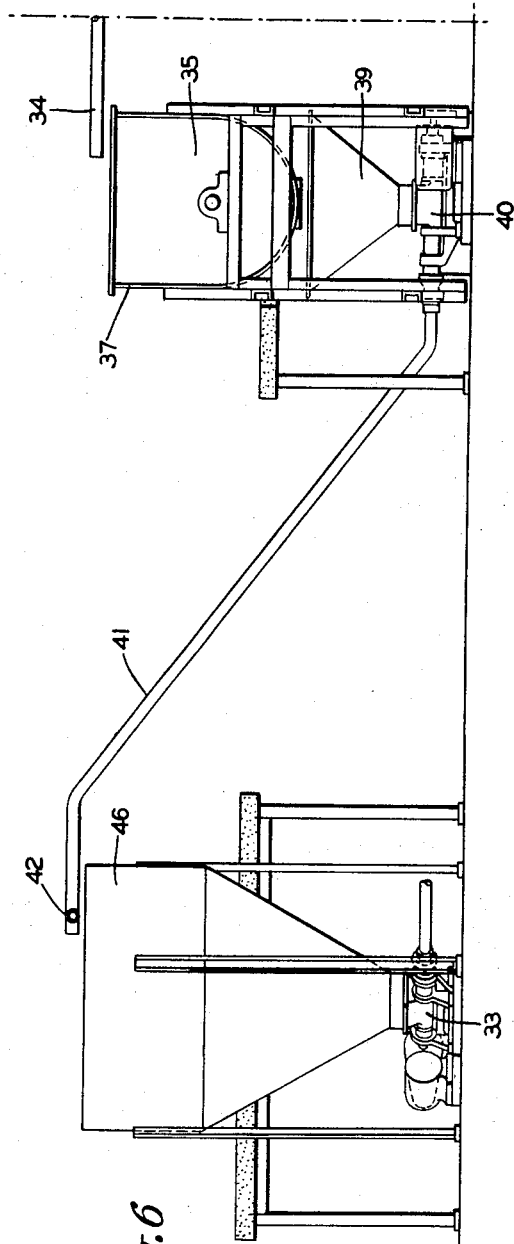

United States Patent Office 3,692,539
Patented Sept. 19, 1972

3,692,539
MANUFACTURE OF SAUSAGE PRODUCTS
Robert L. Dearth, Canton, Ohio, and Rodger M. Lindle, Dallas, Tex., assignors to Sugardale Foods, Inc., Canton, Ohio
Continuation-in-part of application Ser. No. 753,029, July 17, 1968. This application Jan. 19, 1971, Ser. No. 107,722
Int. Cl. A22c 11/00
U.S. Cl. 99—109
4 Claims

ABSTRACT OF THE DISCLOSURE

A procedure for handling ground meat components of various types in a meat packing plant production line for the manufacture of sausage products. Each type of primary or raw meat component used in formulating various wiener, bologna, or other sausage products, in chunks or trimmings as received from a slaughter house in boxes or barrels and in frozen or fresh refrigerated condition, is ground and converted separately and immediately to a semi-liquid or slurry. The slurry is handled and pumped as a liquid to and from separate storage tanks or silos, one for each type of meat component used. The meat component slurries then are pumped as semi-liquids to a mixing and formulating blender from which the formulated product is pumped to a silo serving the stuffing equipment for the particular sausage product to be made.

BACKGROUND OF THE INVENTION

Related application

This application is a continuation-in-part of our co-pending application Ser. No. 753,029, filed July 17, 1968, now abandoned.

Field of the invention

The invention relates to the manufacture of sausage products such as wieners, bologna, and other similar products that are formulated, ground and stuffed into casings in which the sausage products are processed. Such sausage products are formulated from a mixture of a number of types of raw materials or primary meat components, such as pork, lean pork, fat pork, similar grades of beef or veal, etc. These various types of primary meat components usually are received at a sausage plant either frozen or refrigerated as chunks or trimmings in boxes or barrels from the slaughter house where such raw meat products are produced.

Description of the prior art

The normal prior packing house procedure for manufacturing sausage products is to grind the basic or primary meat components as a mixture proportioned according to a particular formula in a grinder. The chunks of meat of different types are conveyed, shoveled or raked from barrels to scales and then to a grinder, chopper, or mixer, and are similarly moved or raked from the grinder or chopper, where moisture called for by the formula and other ingredients such as spices are added, into an emulsifier. The emulsifier discharges the emulsion to a pump which in turn discharges to a vacuum chamber and then to a stuffer wherein the material is stuffed into casings, then smoked in the smoke house, and then peeled and finally packaged.

The handling of chunks or trimmings of meat from the barrels or boxes in which the basic raw components are received to the scales and grinders where the various components are mixed and ground, and the handling of the sticky mass from grinders to emulsifiers has always been very difficult. The meat is a sticky mass and hard to handle. Much handwork is involved in shoveling, raking, pushing and scraping the sticky cooled ground meat mass from the grinder and emulsifier hoppers.

SUMMARY OF THE INVENTION

Objectives of the invention are to eliminate the problems heretofore encountered in handling sticky masses of mushy raw meat solids when processing raw meat products by mixing and grinding various types of meats and formulating the particular sausage products according to recipes; and to handle the basic meat components separately as semi-liquids which can be stored and conveyed separately by pumping as liquids; thus eliminating difficulties heretofore encountered, achieving the indicated objectives simply, effectively and inexpensively, and solving problems and satisfying existing needs.

These objectives and advantages are obtained by the procedures, the general nature of which may be stated as including, in the production of sausage products containing predetermined quantities of a plurality of primary meat components, the steps of separately grinding each of a plurality of primary meat components to desired particle size; separately mixing water and salt with each primary ground meat component to form a slurry of such consistency that it may be pumped as a liquid; separately pumping each primary ground meat component slurry to a storage and distribution silo, one silo for each slurry, thereby providing in pumpable slurry form a separate reservoir of each primary ground meat component to be used in formulating a selected sausage product; pumping slurry from selected slurry reservoirs to a mixer in proportion to the formulated meat mix to be used as a formulated slurry for the manufacture of a selected sausage product; mixing the formulated slurry; and further processing the formulated slurry to form the selected sausage product.

BRIEF DESCRIPTION OF THE DRAWINGS

A preferred arrangement of apparatus which may be used in practicing the new method concepts—illustrative of the best mode in which applicants have contemplated applying the principles—is set forth in the following description and shown in the drawings, and the new method is particularly and distinctly pointed out and set forth in the appended claims.

FIG. 5 is an enlarged elevational view looking in the direction of the arrows 5—5, FIG. 2; and FIG. 6 is a similar view looking in the direction of the arrows 6—6, FIG. 3.

Similar numerals refer to similar parts throughout the drawings.

DESCRIPTION OF THE PREFERRED PROCEDURE

Basic or primary or raw meat product components, such as pork, lean pork, fat pork, similar grades of beef or veal, etc. normally are received at a sausage plant from the source of such meat product, either in frozen form, or in barrels or boxes with the meat refrigerated to a temperature sufficiently low as to resist meat spoilage.

Where the primary meat component is frozen, frozen blocks thereof are delivered to a conveyor 1 (FIGS. 1 and 2) from which the blocks are fed to one or the other of a plurality of frozen meat cutters 2 and 3. Chipped frozen meat is discharged at 4 or 5 from the cutters 2 or 3 into storage and conveyor boxes 6 which may be moved along conveyor 6a and picked up by lift trucks and moved to storage in any convenient cooler (not shown), which may be located to the left of FIGS. 1 and 2.

Fresh primary meat components which have been refrigerated and delivered from a slaughter house to a sausage plant also may be stored in boxes or barrels, similar to the boxes 6, in the cooler. These meat products normally are in the form of chunks or trimmings.

Figure 1:
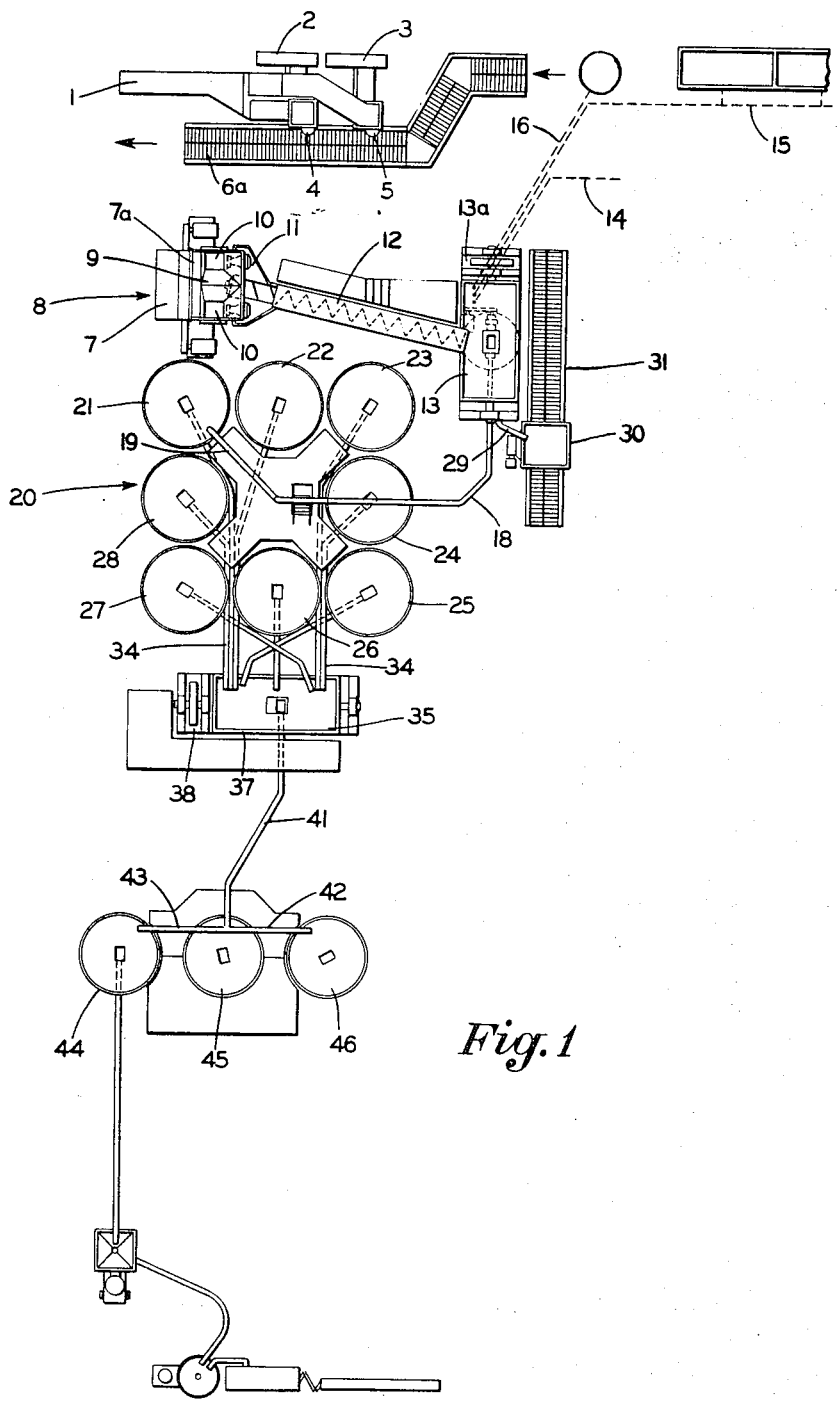
FIG. 1 is a diagrammatic plan view illustrating a plant layout of equipment which may be used to carry out the new method.
Figure 2:
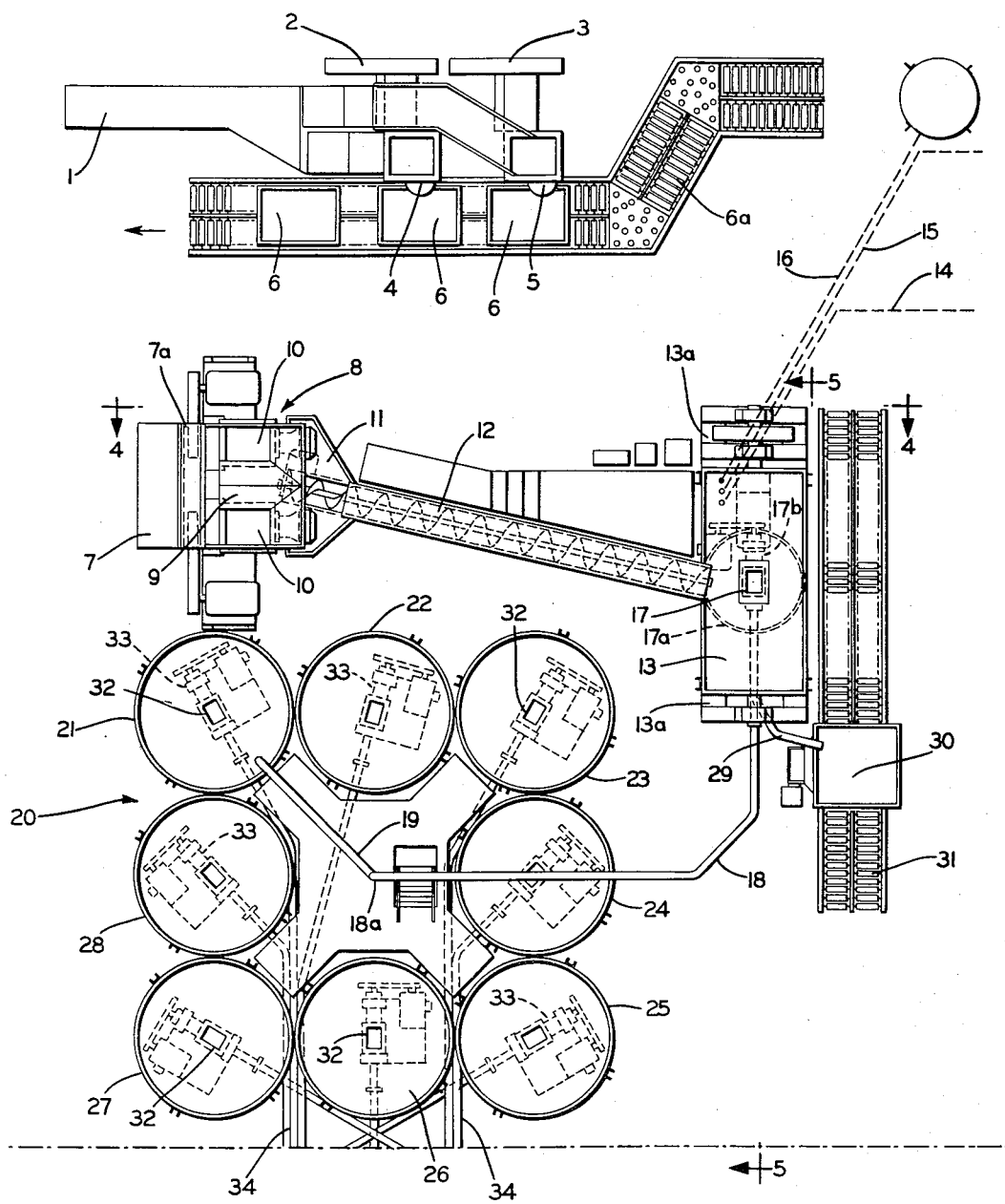
FIG. 2 is an enlarged diagrammatic view of a portion of FIG. 1.
Figure 4:
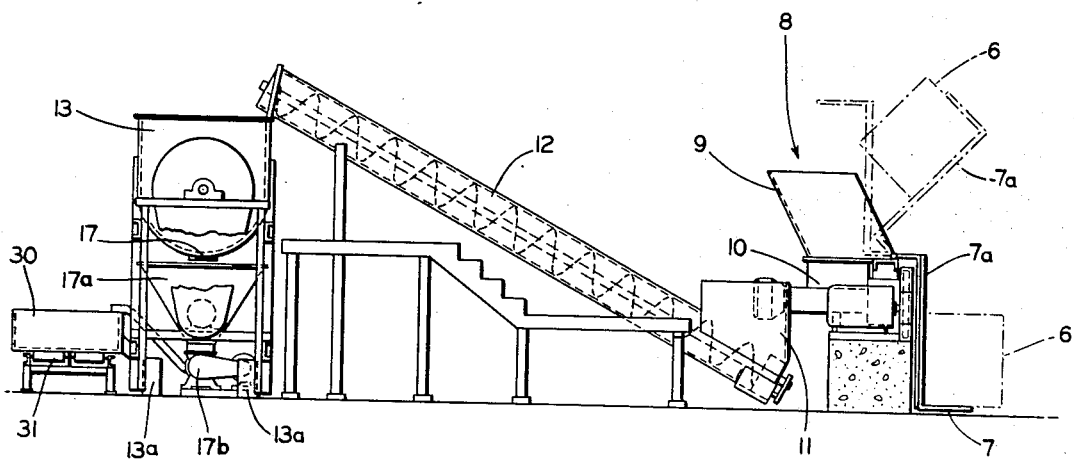
FIG. 4 is a side elevational view looking in the direction of the arrows 4—4, FIG. 2.

Chipped frozen meat or chunks or trimmings of refrigerated meat are removed when needed from the cooler in boxes 6 and placed on and clamped to a platform 7 preferably forming a part of a typical tilting hoist 7a at a grinder station generally indicated at 8 in FIGS. 1, 2 and 4. The platform hoist 7a is moved to lift a box 6 and dump its contents into a feed hopper 9 which feeds the meat product into one or the other of two grinders 10 at grinder station 8. These grinders 10 reduce the basic meat component to the desired particle size dictated by the particular meat product being ground, and which may in some cases be a considerably larger particle size than the ultimate particle size in the sausage product to be produced.

Grinders 10 discharge into a screw conveyor hopper 11 and the ground meat is then conveyed from hopper 11 by screw conveyor 12 to discharge into the top of a large mixer 13 into which some water and salt are added preferably in the form of brine to form a slurry of the particular ground meat product being processed. Mixer 13 is mounted on load scales 13a so that the desired proportions of ground meat, water and salt added at this point may be established in mixer 13. A hot water line leading to mixer 13 is indicated at 14, a chilled water line is indicated at 15, and a brine line providing the salt to be added is indicated at 16.

It is desirable to maintain the brine at a specific salt concentration level so that the same brine mixture may be used for all the usual primary meat components without introducing too great a salt content in the final sausage product. The brine also must provide sufficient salt in the slurry to bind and hold the ground meat components together without separation in the slurry so as to prevent meat components from separating from the suspending liquid which can occur if water alone is used.

The amount of water added in mixer 13 through lines 14 and 15 must be such that the slurry formed is sufficiently fluid to be pumpable. If the amount of water added is too great, the binding effect of the brine is reduced and the water content of the final product unless reduced will be above government regulations, thus requiring additional curing and drying time to remove this excess water.

For example, it has been found that a slurry having a sufficient salt content may be formed by adding to 100 pounds of ground meat components, 8 pounds of brine formed of one part salt and three parts water by weight of the weight of the brine. Varying amounts of additional water also are added depending on the particular meat component used.

The indicated 8 pounds of brine to 100 pounds of meat ratio imparts a salt content to the slurry slightly less than 2% which is below the desirable salt content of any of the normal or usual sausage products desired to be produced by the improved process of the invention. The additional amount of salt required for proper flavoring of the individual sausage products to be produced is added easily during formulation of the particular final sausage product.

Usual meat trimmings available in the industry that can be used for the manufacture of various sausage products include 85/90% lean beef, 80% lean pork, 50% lean pork, and 50% lean beef.

Slurries may be made of such commercial meat trimmings by adding brine in the proportion of 8% by weight of the weight of the meat component. Water also is added to slurries of the first three described types of meat trimmings, in the amount of 8 to 12% by weight, and in the case of 50% lean beef trimmings, the added water is preferably in the range of 15 to 20% by weight.

Thus, where the scales 13a for mixer 13 indicate 1000 lbs. of meat trimmings, such as 50% lean pork, approximately 80 lbs. of brine and preferably 90 lbs. of water are introduced into the mixer 13 through brine line 16 and through hot and cold water lines 14 and 15. Such components added to and mixed in mixer 13 form a primary slurry of 50% lean pork. Similarly, 1000 lbs. of 85/90% lean beef introduced into mixer 13 will have approximately 80 lbs. of brine and 90 lbs. of water added thereto to form a primary slurry of 85/90% lean beef.

Where 50% lean beef is used, 1000 lbs. of this component would have approximately 80 lbs. of brine and preferably 170 lbs. of water added to the mixer 13 to form the primary slurry.

Obviously, the amount of water used in forming a brine solution may be changed if desired, in which event the added water introduced through lines 14 and 15 would be varied to achive the desirable salt to water ratio for formation of the slurry.

In this manner, in accordance with the invention, the slurry produced in mixer 13 is in the form of a semi-liquid which may be pumped as such and conveyed as a liquid to any desired location to establish a separate primary slurry body of a particular meat product for storage or use. Only one type of meat product is fed to and mixed in mixer 13 at any one time. Thus, the slurry consistency of that particular meat product may be established and controlled.

An opening 17 controlled by a valve is provided at the bottom of mixer 13 communicating with the hopper 17a for the inlet of a typical open throat food pump 17b from which the slurry is pumped through a conduit 18 and swivel 18a to a swing pipe 19 which is adapted to be located or swung at the distribution and storage station generally indicated at 20 so as to discharge into any one of a plurality of tanks or silos, eight being illustrated in FIG. 2 at 21, 22, 23, 24, 25, 26, 27 and 28.

Swing pipe 19 may be manually or mechanically controlled to be moved to any indexed position so as to discharge into any particular silo 21–28. One tank or silo 21–28 is provided for each particular type or kind of meat product desired to be used in formulating the sausage product to be manufactured. Normally one of the silos 21–28 is empty so as to receive a particular primary meat component as a slurry from the mixer 13.

Any excess of slurry resulting from mixing a batch of a particular type of primary meat component may be discharged by pipe 29 communicating with pump 17b into a storage box 30 which may be moved along conveyor 31 and picked up by a lift truck and stored in refrigerated condition until its contents can be received in its selected silo.

Each of silos 21–28 is provided at its bottom with a preferably rectangular opening 32 communicating with an open throat pump 33. One pump 33 is located beneath each silo 21–28, as shown. Pump discharge pipes or conduits 34 lead from the pumps 33 to a location above another mixer 35. Conduits 34 discharge into hopper 37 of mixer 35.

The formulation of a formulated slurry body and mixing of the material for any emulsion-type sausage product is accomplished in mixer 35. Any meat component in slurry form may be discharged into mixer 35 through pipes 34 from any of the separate primary slurry bodies located in silos 21–28. Mixer 35 also is mounted on scales 38 so that the recipe for any end product can be accurately formulated; and additional moisture if required, as well as salt, suger, spices and other additives and ingredients are introduced into mixer 35 to form a formulated slurry body.

The number of the various primary slurries mixed together in mixer 35 and the amounts used of each will vary depending upon the particular sausage product to be produced. Also the number and amounts of slurries may vary even for a particular product produced. Thus, various wiener products may be produced by combining two, three, four or more of the primary slurry bodies in various amounts. The controlling factors are the amounts of allowable fat and moisture in the final wiener product, both of which must conform to government regulations, and the desirable minimum amounts of certain meat components in each product.

For example, assume that a wiener product is to be formulated by combining various amounts of the four separate primary slurries of typical meat trimmings referred to above as 85/90% lean beef, 80% lean pork, 50% lean beef and 50% lean pork. The minimum government requirements that must be met are a maximum of 30% fat and a maximum of 10% moisture content in the final wiener product. Likewise, the amounts of the other ingredients must be controlled so as to conform to the ingredient statement on the label of the particular sausage product packaged.

One example of how primary slurries may be combined and formulated in mixer 35 to form a formulated slurry body for producing wieners is set forth in Table A.

TABLE A

| Type of meat trimming | Weight in pounds of— | | | |
|---|---|---|---|---|
| | Primary slurry | Meat trimming | 8% brine | Added water |
| 85/90% lean beef | 936 | 800 | 64 | 72 (9%) |
| 80% lean pork | 2,375 | 2,047 | 164 | 164 (8%) |
| 50% lean beef | 1,540 | 1,232 | 99 | 209 (17%) |
| 50% lean pork | 3,124 | 2,692 | 216 | 216 (8%) |
| Total weights | 7,975 | 6,771 | 543 | 661 |

543 lbs. brine=136 lbs. salt+407 lbs. water.
661 lbs.+407 lbs.=1068 lbs. of water in formulated slurry, so that slurry components are 6771 lbs. of meat trimmings, 1068 pounds of water and 136 pounds of salt.

Tests and experiments have shown that 1657 lbs. of water may be present in the formulated slurry of the example of Table A for the described wiener product, so that after completing predetermined procedures of forming and curing the wieners, their moisture content will conform to government requirements.

Accordingly, as much as 589 lbs. (1657 minus 1068) of water may be added if desired to the formulated slurry in mixer 35 along with the predetermined amounts of spices and additional salt needed to achieve the proper flavoring for the particular wiener product.

In the Table A example for the formulation of a weiner product the 1068 pounds of water in the formulated slurry is 15.773% by weight of the 6771 pounds weight of the meat components of the formulated slurry; and the allowable 1657 pounds of water that may be present is 24.472% by weight of the 6771 pounds weight of the meat components of the formulated slurry.

Another example of how the four primary slurries described above may be combined in mixer 35 to form a formulated slurry body for producing a bologna product is set forth in Table B.

TABLE B

| Type of meat trimming | Weight in pounds of— | | | |
|---|---|---|---|---|
| | Primary slurry | Meat trimming | 8% brine | Added water |
| 85/90% lean beef | 936 | 800 | 64 | 72 (9%) |
| 80% lean pork | 3,662 | 3,158 | 252 | 252 (8%) |
| 50% lean beef | 1,741 | 1,393 | 111 | 257 (17%) |
| 50% lean pork | 2,274 | 1,960 | 157 | 157 (8%) |
| Total weights | 8,613 | 7,311 | 584 | 718 |

584 lbs. brine=146 lbs. salt+438 lbs. water.
718 lbs.+438 lbs.=1156 lbs. of water in formulated slurry, so that slurry components are 7311 lbs. of meat trimmings, 1156 lbs. of water and 146 lbs. of salt.

As in the above wiener example, tests and experiments have shown that 1181 lbs. of water may be present in the formulated slurry of the example of the Table B for the described bologna product so that the final moisture content will conform to government requirements.

Accordingly, 25 lbs. or less (1181 minus 1156) of water may be added if desired along with the predetermined spices and additional salt in mixer 35.

In the Table B example for the formulation of a bologna product the 1156 pounds of water in the formulated slurry is 15.811% by weight of the 7311 pounds weight of the meat components of the formulated slurry; and the allowable 1181 pounds of water that may be present is 16.153% by weight of the 7311 pounds weight of the meat components of the formulated slurry.

Thus, the moisture content of the final product is easily and accurately controlled by the addition of water in mixer 35 depending upon the known quantity of water in each of the primary slurry bodies, and the amount of moisture which will be removed during curing and other processing procedures for the particular sausage product being produced.

In the event that too much water is present in any one of the many possible primary slurry body mixtures formed in mixer 35, no additional water is added. The excess amount of water that othewise would be present in the final product is removed easily by increasing the time or temperature or both of curing the final formulated slurry used. However, it has been found that formation of the primary slurry bodies by combining brine and water in the approximate percentages described eliminates excess water content in the formulated slurry body for most all of the usual sausage products produced by this improved method.

An approximate 2% salt content of each primary slurry has been indicated as preferred so that the salt content of a plurality of primary slurries mixed to form a final product will be less than the final formulated salt content for such final product, and additional salt to provide the desired salt content in the final product is added in forming the final formulated slurry. Such 2% salt content is more than sufficient to bind the ground meat component without separation in the slurry and a smaller salt content, say 1½% by weight of the primary slurry, will hold the meat component bound without separation. When such smaller amounts of salt is used, more will be added in the formation of the formulated slurry for any particular final product being made.

Formulated slurry is discharged from the mixer 35 to the hopper 39 for the inlet of another open throat food pump 40 which pumps the slurry mix through discharge pipe 41 and distribution pipes 42 and 43 to any one of a plurality of formulated product slurry storage tanks. Three such tanks 44, 45 and 46 are shown.

Formulated slurry tank 44 may, for example, provide the feed for a wiener production line; formulated slurry tank 45 may provide the feed for a bologna production line; and formulated slurry tank 46 may provide the feed for a condiment production line.

Figure 3:
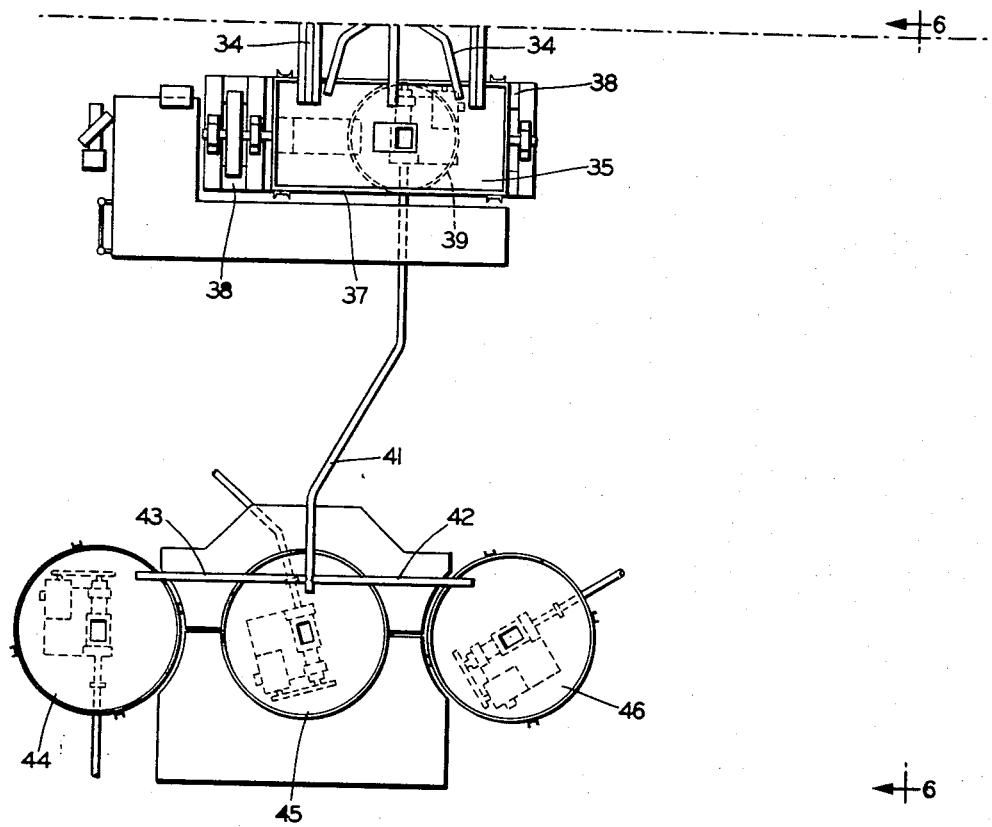
FIG. 3 is an enlarged diagrammatic view of another fragmentary portion of FIG. 1.

The procedure carried out and equipment illustrated in FIG. 3 from beyond mixer 35 is standard or usual and forms no part of the invention except to provide for the ultimate manufacture of the desired end product.

The new concept of the present invention departs radically from prior practice in the equipment and procedures used leading up to the discharge of components into and the mixing thereof in mixer 35. In accordance with the new concept, all actual manual handling by scraping, raking, shoveling, etc. of the meat components is eliminated. After the meat products are dumped from boxes 6 into hopper 9 at the grinder station 8, the meat components are handled and controlled separately and individually, are separately and individually stored, are conveyed and stored separately as a slurry from and beyond the mixer 13, and are discharged as liquids for formulating and mixing into the formulating mixer 35.

This concept eliminates the handling problems heretofore encountered in the production and handling of ground meats from which sausage products are made.

In addition to the advantages in handling the primary components by pumping as a liquid, it is possible to provide for and control the grind size of each particular component to have the most advantageous size with respect to the particular meat involve and the end product to be produced. The mixing of the ground meat in mixer 13 with brine to form a slurry coats the ground meat particles with water so that they are slippery and can be pumped and will not bridge over in a hopper above a pump intake. Thus, enough slippage is provided along the sides at the hopper bottoms of the silos 21–28 that the slurry slips downward therein to the intakes of the pumps 33. Likewise, the brine in the slurry provides for a more uniform slurry by maintaining the meat particles in suspension eliminating separation of such particles from the suspending water and brine.

Each of the large mixers 13 and 35 preferably is provided with a motor operated door for its rectangular outlet located above the hopper for the open throat food pump 17b or 40 therebelow. The use of an open throat food pump below each of the mixers and silos may be advantageous in not damaging or mashing the meat, the particle size of which may have been determined by previous grinding operations. All other known types of pumps that have been used for the manufacture of ground meat products in the past sometimes may cause damage by mashing the meat particles to some degree.

The open throat food pump is of further advantage in that it involves the use of a large rectangular opening as the pump inlet which can accommodate a similar opening at the bottom of a mixer or silo so that the silo may be provided with steep angular walls along which the slurry will slip and not bridge.

In the past, in storing meat products in silos and pumping in other manners without an open throat pump, the pump had to be fed by a pipe and it was necessary to force-feed the meat from the silo into the pipe and dislodge bridged meat therein.

As previously stated, the meat components even in slurry form are maintained at a temperature below 50° F. in the silos to prevent meat spoilage. This means that the meat particles themselves are somewhat hard and sticky. This characteristic, however, is counteracted by the slurry condition of the meat product in the silo so that the meat particles themselves are somewhat hard and will self-feed from the silo to the open throat pump.

The improved procedure of the present invention may be readily and effectively controlled and carried out and provides for the manufacture of many different sausage product recipes from many different primary meat components with the elimination of all direct manual handling of the primary meat components; provides a procedure by which the particle size of any particular meat component may be controlled and remain undamaged in the processing and formulation of the desired end product; and provides for the elimination of handling problems with respect to ground meat which have plagued the industry for many years, thereby eliminating prior art difficulties and achieving the objectives of the invention in a simple and effective manner.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details illustrated and described or to the manufacture of one particular sausage product.

Having now described the features, discoveries and principles of the invention, a preferred arrangement of equipment by which the improved method may be carried out, the characteristics of the new procedure, and the advantageous, new and useful results obtained; the new and useful methods, steps, procedures and arrangements, and mechanical equivalents obvious to those skilled in the art are set forth in the appended claims.

We claim:

1. In a method of making sausage products containing predetermined quantities according to formula of a plurality of primary meat components selected from the class consisting of pork, beef and veal components in frozen, chunk and trimmings form; the steps of separately grinding each of a plurality of primary meat components each to desired particle size; immediately separately mixing water and salt with each primary ground meat component to form a primary pumbable semi-liquid slurry composed of the meat component, water and salt; controlling the amount of water added to form each slurry at from 15.773% to 24.472% by weight of the weight of the meat content of the slurry to provide a slurry of such consistency that it may be pumped as a liquid; controlling the amount of salt in each primary ground meat component slurry to be between 1½% to 2% by weight of the weight of the meat content, and sufficient to bind and hold the ground meat component without separation in the suspending primary slurry liquid; establishing a separate primary slurry body of each primary ground meat component to be used in formulating a selected sausage product and pumping each separate primary slurry as formed to its separate primary slurry body; maintaining the meat components in the separate primary slurry bodies at a temperature below 50° F.; mixing, in accordance with and in proportion to the formula requirements for a meat mix to be used for the manufacture of a selected sausage product, selected primary slurry components to form a formulated slurry body, and pumping said selected primary slurry components to the formulated slurry body to establish and maintain said formulated slurry body; and pumping formulated slurry from said formulated slurry body and further processing said pumped formulated slurry to form said selected sausage product.

2. The method set forth in claim 1 in which salt is added in the form of brine to form each primary slurry, and in which the brine is formed of one part salt and three parts water by weight of the weight of the brine.

3. The method set forth in claim 2 in which a ratio of eight pounds of brine to one hundred pounds of ground meat component are mixed to impart the salt content of each primary slurry.

4. The method set forth in claim 3 in which the water content of each primary slurry comprises the water in the brine and additional water in an amount of from 8% to 20% of weight of the weight of the meat content of such primary slurry.

References Cited

UNITED STATES PATENTS

| | | | |
|---|---|---|---|
| 3,047,398 | 7/1962 | Watt | 99—109 |
| 3,050,399 | 8/1962 | Kielsmeieiz et al. | 99—109 |

HYMAN LORD, Primary Examiner